US006323871B1

(12) United States Patent
Fujiyoshi et al.

(10) Patent No.: US 6,323,871 B1
(45) Date of Patent: Nov. 27, 2001

(54) DISPLAY DEVICE AND ITS DRIVING METHOD

(75) Inventors: Tatsumi Fujiyoshi; Hiroyuki Hebiguchi, both of Miyagi-ken (JP)

(73) Assignees: LG Philips LCD Co., Ltd., Seoul (KR); Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/120,107

(22) Filed: Jul. 21, 1998

(30) Foreign Application Priority Data

Jul. 24, 1997 (JP) .................................................. 9-199040

(51) Int. Cl.[7] ..................................................... G06T 11/00
(52) U.S. Cl. ............................................... 345/598; 345/88
(58) Field of Search ..................... 345/88, 152; 349/106, 349/143, 144

(56) References Cited

U.S. PATENT DOCUMENTS 4,642,627 * 2/1987 Hodsdon .............................. 340/765
5,122,783 * 6/1992 Bassetti, Jr. .......................... 340/701
5,151,689 * 9/1992 Kabuto et al. ....................... 340/784
5,159,478 * 10/1992 Akiyama et al. ...................... 359/69
5,168,270 * 12/1992 Masumori et al. .................. 340/784
5,192,945 3/1993 Kusada .
5,833,507 * 11/1998 Woodgate et al. ................... 349/110

* cited by examiner

*Primary Examiner*—Almis R. Jankus
(74) *Attorney, Agent, or Firm*—Brinks Hofer Gilson & Lione

(57) ABSTRACT

A matrix-addressed liquid crystal display device, and its driving method in which pixels to display one color by combining a plurality of basic colors are arranged, the power consumption in a drive circuit system is reduced, and no degradation of the image quality is generated, is characterized by comprising a signal input means N, wherein a large number of pixels are matrix-addressed by a large number of scanning lines G and a large number of signal lines S, combination of a plurality of basic colors are repeatedly arranged along the direction of each signal line, the number of the scanning lines is the number of all pixels arranged along the signal lines, the order of the basic colors arranged along the signal lines is repeatedly the same number along the signal lines, the same basic colors are arranged along the scanning lines, and the signal to be transmitted to each signal line for each scanning line is successively transmitted to a source driver from the source driver Sd.

5 Claims, 16 Drawing Sheets

DISPLAY DEVICE AND ITS DRIVING METHOD

BACKGROUND OF THE INVENTION

1. Field of the Invention

The present invention relates to a matrix-addressed display device to display one color by combining a plurality of basic colors, for example, R (Red), G (Green) and B (Blue), and its driving method.

2. Description of the Related Art

A liquid crystal display device capable of performing the color display by making use of a display element such as liquid crystal, and combining the light source and a color filter therewith, has been known. A thin film transistor addressing type liquid crystal display device is described below as an example, in which a picture element to perform one color display is constituted by combining three basic colors of R, G and B as the color filter, a large number of the picture elements are arranged in the display region, the signal line and the scanning line are arranged in the matrix to drive the liquid crystal and the pixel electrode is arranged in the region demarcated by the signal line and the scanning line, switching to the pixel electrode is performed by the thin film transistor and the electric field is applied to the liquid crystal corresponding to each pixel, the transmittance ratio of the liquid crystal is changed to switch the display/non-display.

In the display device for a computer to which such a liquid crystal display device is applied, the number of picture elements (one picture element is constituted by one set of R, G and B pixel) which are the unit of display is 640×480=307200 picture elements in the display of VGA specification to display 640 (transverse)×480 (longitudinal) picture elements, and the number of the scanning lines and the signal lines are 480 and 1920 (=640×3) respectively because of three divisions into RGB along the scanning line. Thus, the total number of pixels is 640×3×480=921600.

FIG. 17 is a view illustrating a color liquid crystal addressing unit in which the addressing LSI is mounted on the screen of this type of color liquid crystal display device. In this figure, 1 denotes the liquid crystal display device in which the liquid crystal is filled between two transparent substrates which are arranged opposite to each other, one transparent substrate is provided with a common electrode and a color filter, and a large number of signal lines and scanning lines are arranged in the matrix in the longitudinal direction and in the transverse direction respectively on the other transparent substrate, and the pixel electrode and the thin film transistor are provided in the region which is surrounded and demarcated by the signal lines and the scanning lines, and in this example, a plurality of gate drivers Gd for addressing the scanning line are mounted on the left side part of the liquid crystal display device 1, and a plurality of source drivers Sd for addressing the signal line are mounted on the upper side and the lower side of the liquid crystal display device.

FIG. 18 is a partially enlarged view of the circuit of the liquid crystal display device 1 in this example, and in the circuit of this example, the signal lines $S_1$, $S_2$, $S_3$ and $S_4$ in the longitudinal row and the scanning lines $G_1$,$G_2$ in the transverse row are formed in a large number of matrixes in a crossing manner, a pixel electrode 5 and a thin film transistor 6 are provided in each region demarcated by the signal lines and the scanning lines, one region forming the pixel electrode 5 forms one pixel, and three pixels are collected to form one picture element.

Thus, in the circuit illustrated in FIG. 18, the picture element 7 surrounded by the chain dot line in FIG. 18 is constituted, and in the display device of the above-mentioned VGA specification, 307200 picture elements 7 are formed on one screen.

The source driver Sd and the gate driver Gd provided on the liquid crystal display device 1 of this number of pixels usually comprise one LSI having about 240 output pins, and the source driver and the gate driver to be mounted on the transparent substrate of the liquid crystal display device 1 are normally of TCP (Tape Carrier Package) type in which the LSI mounted on a polyimide tape is used, or of the COG (Chip On Glass) type in which the LSI is directly mounted.

So as to be adapted to 1920 signal lines and 480 scanning lines to be used in the above-mentioned display device 1, it has been necessary to use eight source drivers Sd having 240 pins (240×8=1920) and two gate drivers Gd having 240 pins (240×2=480) as illustrated in FIG. 17. In an actual liquid crystal display device, a separate circuit to feed the signal, etc., to the drivers is necessary but the explanation is omitted here.

As for the power consumption of the above-mentioned drivers, the power consumption of the source driver Sd is larger than that of the gate driver Gd as described below.

Power consumption of drivers: (about 840 mW)

* Gate driver: low (about 20 mW×2=40 mW: occupying 5%)
* Source driver: high (about 100 mW×8=800 mW: occupying 95%)

It is also known that the source driver is generally about two times as expensive as the gate driver in the cost.

The power consumption of the above-mentioned source driver is for the typical 6 bit (gray scale number: 64) with color display in the present status, and in the case of the source driver of 8 bit type, both the price and the power consumption are increased, and the difference in the price and the power consumption between the gate driver and the source driver are further increased.

In the condition background, it is desired to reduce the required number of these expensive drivers in order to reduce the cost and the power consumption of the liquid crystal display device in which the size of the screen is further increased and the gray scale is promoted.

If degradation of the image quality such as flicker is generated in exchange for reduction of the power consumption, the degradation becomes remarkable because of the large size of the screen. Thus, it is necessary to reduce the power consumption and to maintain the image quality, and it is desired to efficiently drive the liquid crystal display device while these excellent characteristics are satisfied.

The present invention copes with the above-mentioned circumstances, and the purpose of the present invention is to arrange the picture element to display one color by combining a plurality of basic colors, to reduce the power consumption in the drive circuit system in the matrix-addressed display device, and to provide the liquid crystal display device not to cause degradation of the image quality and its driving method.

SUMMARY OF THE INVENTION

The present invention is characterized in that, to solve the above-mentioned problems, a large number of pixels are matrix-addressed by a large number of scanning lines and a large number of signal lines, combination of a plurality of basic colors is repeatedly arranged, the number of the scanning lines is the number of the total pixels arranged along the signal lines, the order of the basic colors arranged along the signal lines is repeatedly the same order along the signal lines, the same basic colors are arranged along the scanning lines, and a signal input means to successively transmit to the source driver the signal to be transmitted to each signal line for each scanning line from the source driver is provided.

A preferable signal input mode can be taken to each matrix-arranged pixel if the signal input means to successively transmit to the source driver the signal to be transmitted to each signal line for each scanning line from the source driver is provided.

The data input of the addressing signal at the order of the data of the color for each scanning line can be realized only by changing a part of the data input format of the addressing signal which has been used, and changing a part of the addressing signals, and the circuit can be easily changed to a minimum.

Further, in the above-mentioned structure, if a structure is employed where the number of the scanning lines is the number several times larger than the number of the above-mentioned basic colors to the number of the total pixels arranged along the signal lines, and the order of the basic colors arranged along the signal lines is repeatedly same along the signal lines, the source driver which is large in power consumption and expensive can be greatly reduced in number without generating degradation in the image quality compared with that of a conventional structure. Further, in this structure, though the required number of gate drivers which are smaller in power consumption and more inexpensive than the source driver is increased, the reduction in power consumption and cost attributable to the reduction of source drivers is more effective than the increase in cost attributable to the increase of gate drivers, and the power consumption and cost can be reduced more than the conventional structure as a whole.

One of the addressing method of the present invention is characterized in that the total scanning lines can be successively scanned in one frame in driving the display device of the above-mentioned basic constitution.

The cost and the power consumption can be greatly reduced while the completely same display performance as that of the conventional device is maintained.

Further, one frame can be divided into a plurality of fields to realize the interlaced scanning for the prescribed fields. The number of the prescribed fields is preferably the number corresponding to the number of the basic colors. For example, the number of the fields is three in the case of the three basic colors.

Thus, the power consumption can be further reduced even when the animation processing is slightly delayed.

The present invention may be of the basic constitution mentioned above, and of the constitution where the driving method to successively drive the total scanning lines in one frame and the driving method to divide one frame into a plurality of fields and to perform the interlaced scanning for the prescribed fields can be freely selected by a switching means.

Thus, the driving method can be used differently in the case of the animation processing when the excellent image quality is required, or in other cases, enabling the switching use of the case to cope with the excellent image quality and low power consumption, and the case to cope with lower power consumption.

BRIEF DESCRIPTION OF THE DRAWINGS

FIG. 9 is a block diagram illustrating one example of a liquid crystal display device in which the display device illustrated in FIG. 1 is built in;

FIG. 14 is a view showing the relationship of the input signal to the source driver and the output data.

DESCRIPTION OF THE PREFERRED EMBODIMENT

Figure 1:
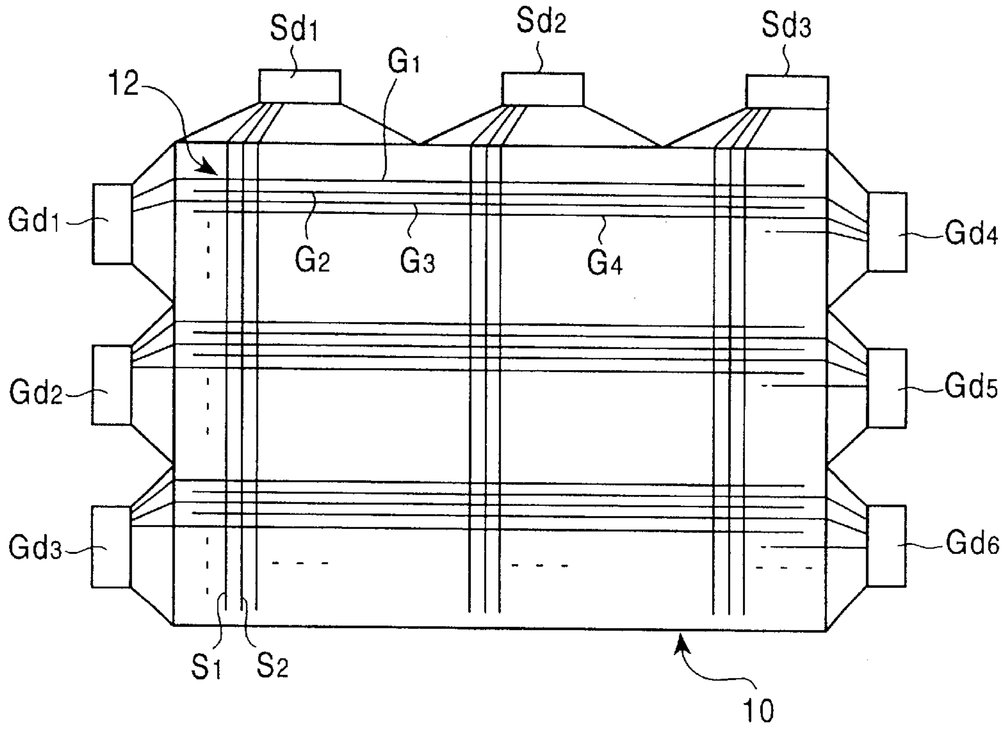
FIG. 1 is a plan view illustrating a first embodiment of a display device of the present invention.

An embodiment of the present invention is described referring to the drawings.

FIG. 1 is a view illustrating one mode in which the present invention is applied to the thin film transistor addressing liquid crystal display device, and in the mode, the liquid crystal is filled between two transparent substrates to constitute a liquid crystal display device 10, and three ($Sd_1$–$Sd_3$) source drivers Sd are provided on an upper edge part of the transparent substrates of the liquid crystal display device 10, and total six gate drivers Gd ($Gd_1$–$Gd_6$) are provided, three of which on the left side part and another three on the right side part of the transparent substrates of the liquid crystal display device 10.

A common electrode and a color filter are provided on one substrate of two transparent substrates to constitute the liquid crystal display device 10, and a thin film transistor circuit is constituted on the other transparent substrate. A part corresponding to one picture element of the circuit constitution is illustrated in FIG. 2 in an enlarged manner.

One picture element 12 in this mode comprises a region demarcated by two signal lines $S_1$,$S_2$ in the longitudinal row, and four scanning lines $G_1$,$G_2$,$G_3$ and $G_4$ in the transverse row. One pixel electrode 11 is provided in the region surrounded by the signal lines $S_1$,$S_2$ and the scanning lines $G_1$,$G_2$ to form one pixel by this region, one pixel electrode 11 is provided in the region surrounded by the signal lines $S_1$,$S_2$ and the scanning lines $G_2$, $G_3$ to form one pixel by this region, one pixel electrode 11 is provided in the region surrounded by the signal lines $S_1$,$S_2$ and the scanning lines $G_3$, $G_4$ to form one pixel by this region, and one picture element 12 is constituted by these three pixels and a thin film transistor T is constituted as a switch element on the side part of each pixel electrode 11.

Figure 2:
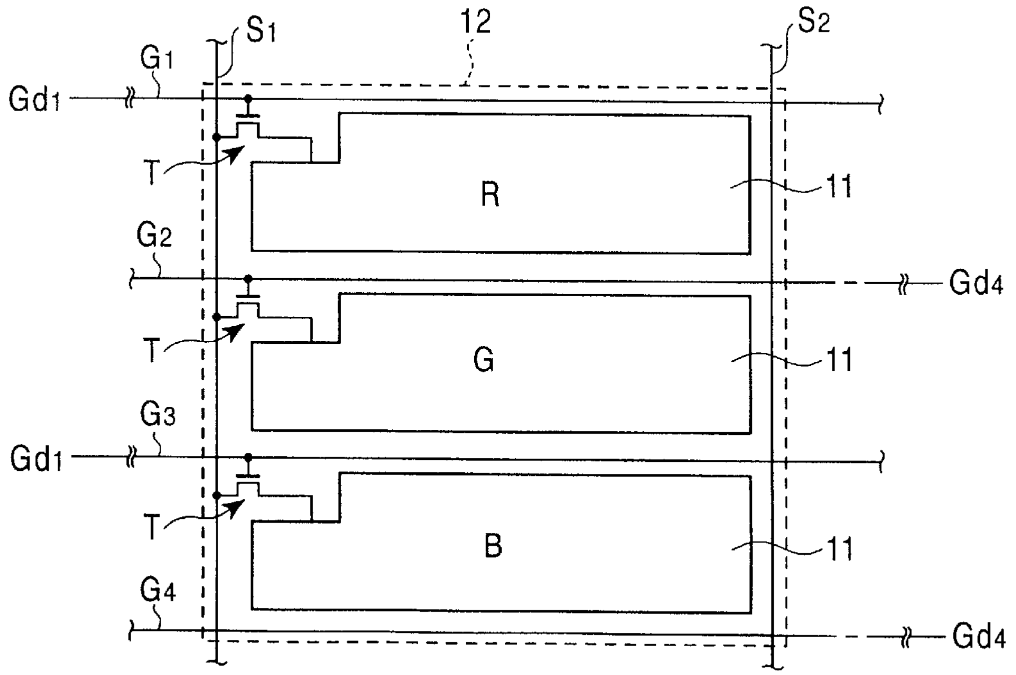
FIG. 2 is an enlarged view showing the relationship between the pixel of the display device illustrated in FIG. 1 and a thin film transistor structure.
Figure 3:
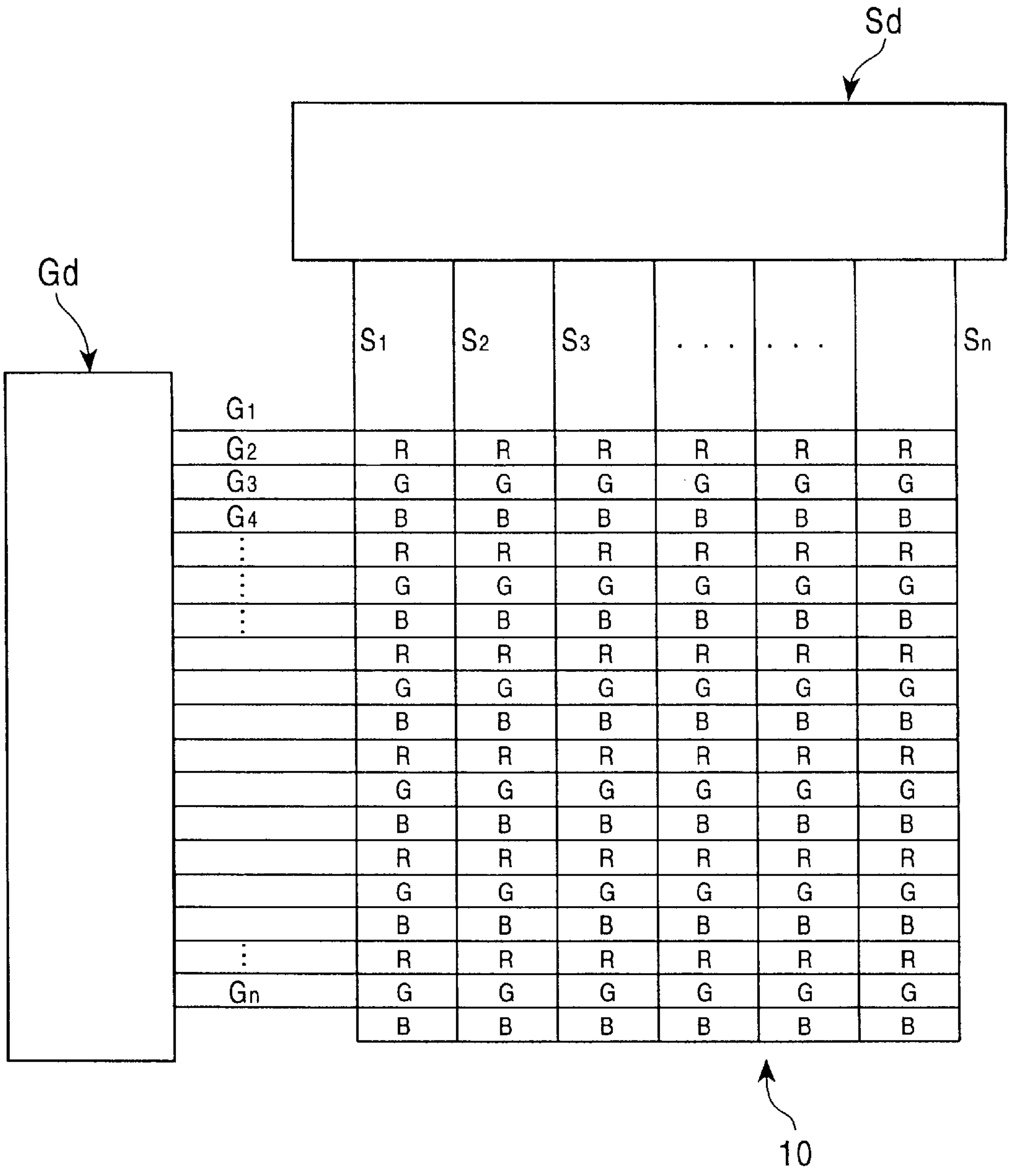
FIG. 3 is a view showing one example of the RGB arrangement condition of a color filter and the connection condition of a source driver and a gate driver in the structure illustrated in FIG. 1.

A color filter is provided on the other substrate opposite to the transparent substrate on which the pixel electrode 11 is constituted, and in this mode, among one picture element illustrated in FIG. 2, the color filter R as indicated in FIG. 3 is arranged at the position opposite to the pixel electrode 11 on the upper stage, the color filter G as indicated in FIG. 3 is arranged at the position opposite to the pixel electrode 11 on the middle stage, and the color filter B as indicated in FIG. 3 is arranged at the position opposite to the pixel electrode 11 on the lower stage, respectively. The arrangement of the color filters RGB including a plurality of other picture elements are indicated in FIG. 3, and in this mode, the color filters are arranged in the order of the colors of RGB and RGB along the longitudinal direction (the vertical direction in FIG. 3) of each signal line S, the color filters are arranged in the order of R in the direction of the scanning line $G_1$, G in the scanning line $G_2$, B in the direction of the signal line $G_3$, R in the direction of the scanning line $G_4$, G in the direction of the scanning line $G_5$, and B in the direction of the scanning line $G_6$, respectively, and other color filters are arranged in similar order.

Further, in this mode, 640 signal lines Si are provided to perform the display of VGA specification, and 480×3=1440 scanning lines G are provided. Thus, in this mode, the number of picture elements is 640×480=307200, which is same as that in the conventional structure illustrated in FIG. 17, but the number of the signal lines is reduced to ⅓ that of the conventional structure. However, the number of the scanning lines is three times (times of the numbers of basic colors) of the conventional structure illustrated in FIG. 17.

If an LSI for driving 240 pins which are same in number as the conventional structure is used in this structure, three source drivers Sd can be arranged to provide up to 240×3=720 signal lines, and 80 signal lines are affordable while the number of the signal lines is 640 for the display of VGA specification, and as indicated in FIG. 1, three source drivers $Sd_1$–$Sd_3$ are provided, and in reality, the total terminals of two source drivers $Sd_1$,$Sd_2$ and about 160 terminals of the third source driver $Sd_3$ are connected to the signal lines Si.

In the gate driver Gd, the required number of scanning lines is 1440, and if the LSI of 240 pins is used, six LSIs are required, and as indicated in FIG. 1, six gate drivers $Gd_1$–$Gd_6$ are provided. The connection mode of the scanning line G to the gate driver $Gd_1$ on the top left side of the transparent substrate and the gate driver $Gd_4$ on the top right side is described. The scanning lines $G_1$,$G_3$ are alternately connected to the gate driver $Gd_1$ on the top left side of the transparent substrate, and the rest of the scanning lines $G_2$,$G_4$ are alternately connected to the gate driver $Gd_4$ on the top right side. Thus, total 480 gate drivers G of $G_1$-$G_{480}$ are alternately connected to the gate driver $Gd_1$ and the gate driver $Gd_4$ which are opposite to each other in the right-to-left direction.

Because the source driver Sd is about two times as expensive as the gate driver Gd, the cost can be greatly reduced by reducing the number of expensive source drivers Sd from eight in the conventional structure to three in the present invention. Because the gate driver Gd is about at half the price of the source driver Sd, and even when six gate drivers are necessary while two gate drivers are necessary in the conventional structure illustrated in FIG. 17, and the required cost is increased, the increase in the required cost attributable thereto is more effective than the reduction in cost attributable to the reduction in number of the source drivers Sd. Thus, the cost can be reduced by reducing the number of expensive source drivers without changing any number of the display pixels as a result.

From the aspect of the power consumption, the total power consumption of six gate drivers of about 20 mW in unit power consumption is 120 mW, and the total power consumption of three source drivers of about 100 mW in unit power consumption is 300 mW, and the grand total of the power consumption is about 420 mW, which is suppressed at half compared with about 840 mW for the conventional structure.

Recently, there is a structure where a part of the drive circuit is built in the transparent substrate for liquid crystal by forming the thin film transistor drive circuit simultaneously in forming the thin film transistor circuit on the transparent substrate using poly-silicon, but the power consumption is larger in the source driver Sd in which the multiple gray scale signal of about 6–8 bits must be processed at high speed compared with the gate driver Gd of 1-bit in order to control the turning-on/turning-off of the pixel electrode for liquid crystal display, and the number of transistors is larger in the source driver Sd, presenting the problem of poor yield. Thus, even in the liquid crystal display device in which the drive circuit is built, reduction of the number of signal lines and reduction of source drivers Sd contribute much to reduction in power consumption and improvement of the yield.

Further, in this mode, RGB arrangement of the color filter is made as indicated in FIG. 3, but RGB arrangement of the color filter is not limited to that in this mode.

Then, the case to drive the liquid crystal display device of the above-mentioned mode is described referring to FIGS.1 through 3.

Figure 17:
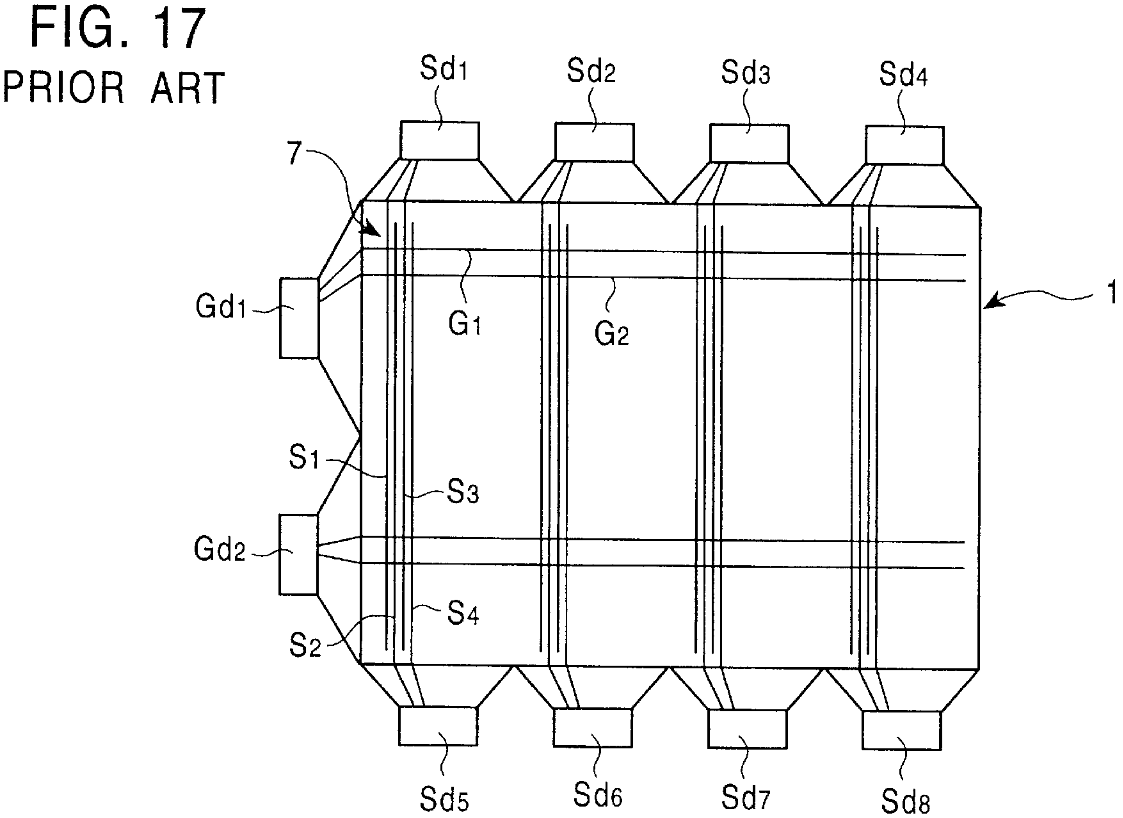
FIG. 17 PRIOR ART
FIG. 17 is a plan view of one example of the conventional liquid crystal display device.
Figure 18:
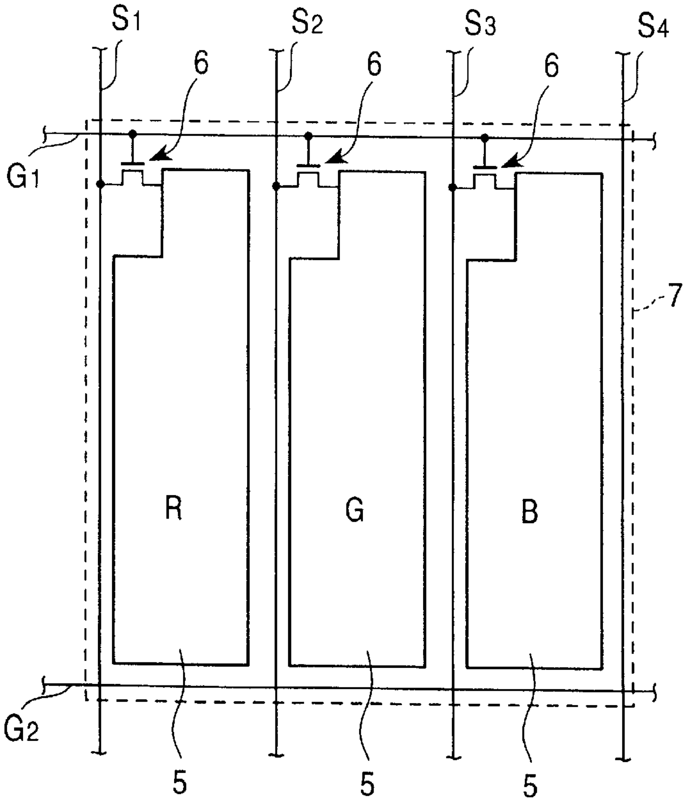
FIG. 18 PRIOR ART
FIG. 18 is an enlarged view of one pixel of the conventional liquid crystal display device illustrated in FIG. 17.

The driving method of the liquid crystal display device of the above-mentioned mode is described in comparison with the driving method of the conventional liquid crystal display device illustrated in FIGS. 17 and 18.

In displaying 640×480 picture elements of the display device of VGA specification in the conventional liquid crystal display device illustrated in FIGS. 17 and 18, the frame frequency is 60 Hz (the screen is re-written 60 times a second), and it takes about 16 msec to re-write one screen. That means, 480 scanning lines are scanned in this 16 msec. Thus, the frequency at which the gate driver Gd scans each scanning line is about 30 kHz (60 Hz×480; i.e., about 30 μsec for each scanning line).

On the other hand, on the signal line side, the signals for 640×3=1920 signal lines are transmitted to the source driver Sd on the time series basis, and temporarily stored, and the total signals for 1920 signal lines are transmitted at one time. Thus, the dot clock to read the signal to be transmitted on the time series basis for each picture element (three pixels) is about 25 MHz including 30 kHz×640 and the fly-back time.

On the other hand, if the frame frequency is assumed to be 60 Hz similar to the previous case using the liquid crystal display device of the structure illustrated in FIGS. 1 and 2, the number of the scanning lines G is three times for R, G and B compared with that of the conventional structure illustrated in FIGS. 17 and 18, and driving is performed at the scanning speed three times as high as that of the conventional structure.

More specifically, the number of the scanning lines G is 480×3=1440, and the number of the signal lines S is 640, and the frequency when the gate driver Gd scans the scanning lines G is about 60 Hz×480×3=90 kHz. The gate driver which is generally used can be driven up to at about 100 kHz, and from this viewpoint, the same gate driver as that in the conventional structure can be used.

On the other hand, in the structure illustrated in FIGS. 1 and 2, the number of signal lines S can be reduced to 640 which is ⅓ that of the conventional structure illustrated in FIGS. 17 and 18, and the dot clock of the source driver Sd is about 25 MHz including 90 kHz×640/3 and the fly-back time (because one picture element corresponds to three pixels), which is left unchanged from that in the conventional structure.

Thus, in the structure illustrated in FIGS. 1 and 2, the same gate driver Gd and source driver Sd as those in the conventional structure can be used without any change.

Figure 6:
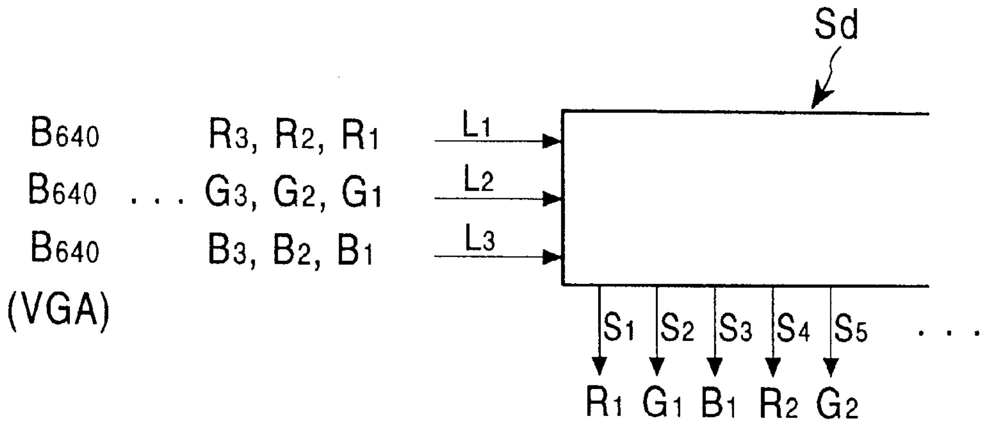
FIG. 6 is a view showing the relationship between the input signal to the source driver and the output data in driving a conventional display device illustrated in FIG. 17 and FIG. 18.

The data input format in the above-mentioned LCD driving system is described more in detail. In the conventional liquid crystal display device illustrated in FIGS. 17 and 18, among the input signal to the source driver Sd, R data (R1,R2,R3 . . . R640) are transmitted to a first line $L_1$, G data (G1,G2,G3 . . . G640) are transmitted to a second line $L_2$, and B data (B1,B2,B3 . . . B640) are transmitted to a third line $L_3$, and the signal transmitted to the source driver Sd is accumulated by one horizontal scanning period, and outputted as $R_1$, $G_1$, $B_1$, $R_2$, $G_2$, $B_2$, . . . $R_n$, $G_n$, $B_n$ as indicated in FIG. 6 to the signal lines $S_1$, $S_2$, $S_3$, $S_4$, $S_5$ . . . $S_n$ indicated in FIG. 6 or FIG. 19 in the serial-parallel converted form in the source driver Sd.

Figure 11:
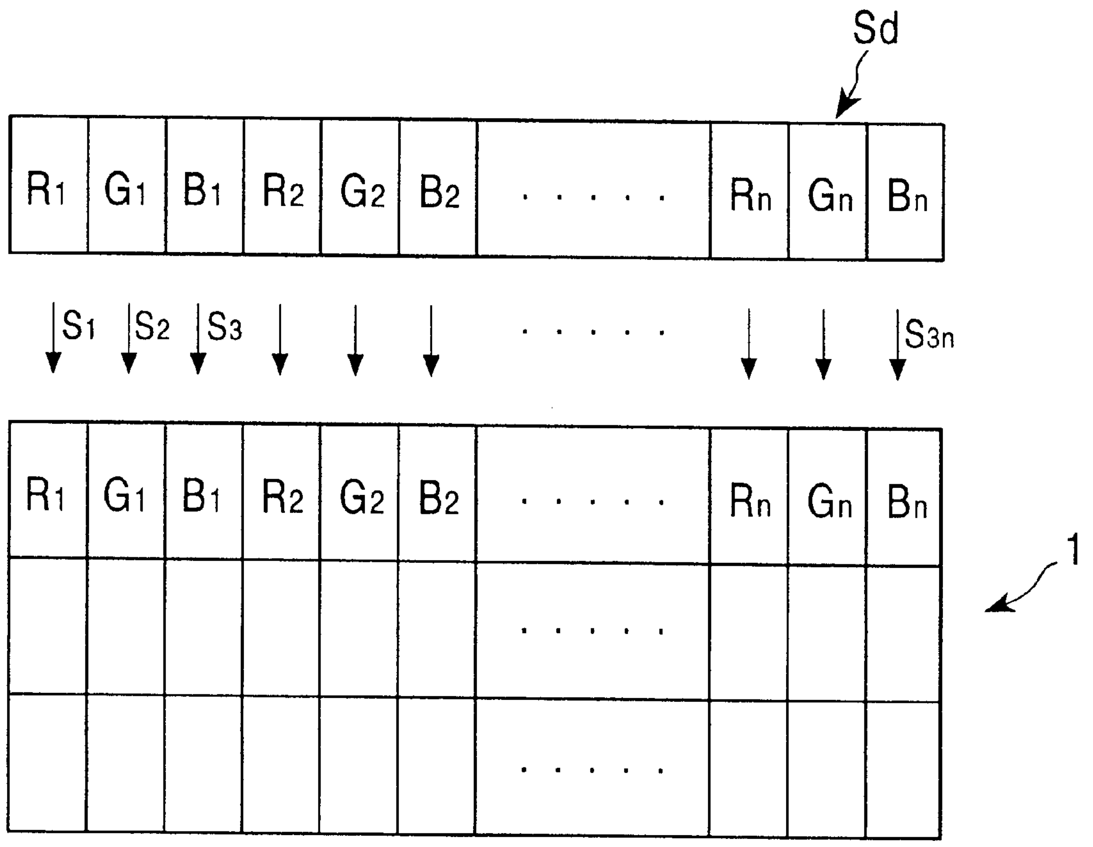
FIG. 11 is a view showing the relationship between the output data of the source driver and the array condition of the pixel of the liquid crystal display device in driving the conventional display device illustrated in FIG. 17.
Figure 19:
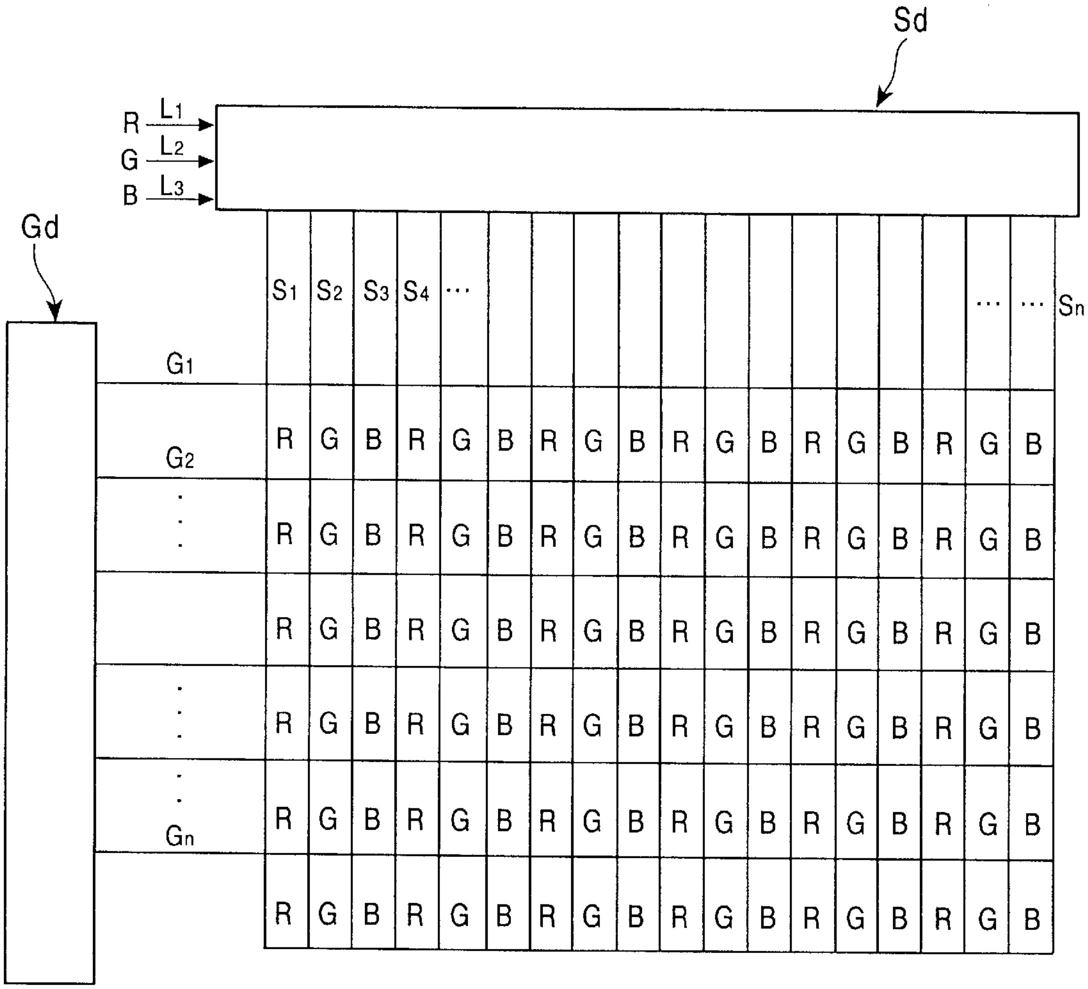
FIG. 19 PRIOR ART
FIG. 19 is a view showing the RGB arrangement condition of the color filter of the conventional liquid crystal display device illustrated in FIG. 17, and an example of the connection condition of the source driver and the gate driver.

The condition of the output signal from the above-mentioned source driver Sd can be described in a simplified manner as indicated in FIG. 11, and it can be concluded that the appropriate driving signal can be inputted to the liquid crystal display device of the structure illustrated in FIG. 19 because the signal output mode indicated in FIG. 11 coincides with the pixel arrangement of R, G and B of the liquid crystal display device illustrated in FIG. 19.

When the conventional data input format indicated in FIG. 6 is applied to the liquid crystal display device illustrated in FIGS. 1 and 2, the source driver Sd tries to perform the serial-parallel conversion same as the previous one, and the liquid crystal display device can not be appropriately driven as it is, and if the similar driving input to that in the case indicated in FIG. 6 is applied to the liquid crystal display device illustrated in FIGS. 1 and 2, the driving signal must be regulated by providing a separate logical circuit such as a memory.

Thus, in the present invention, the data input format is changed so that the liquid crystal display device can be driven even when the same source driver Sd as that in the conventional structure is appropriated as it is and no other circuit is added.

Figure 5:
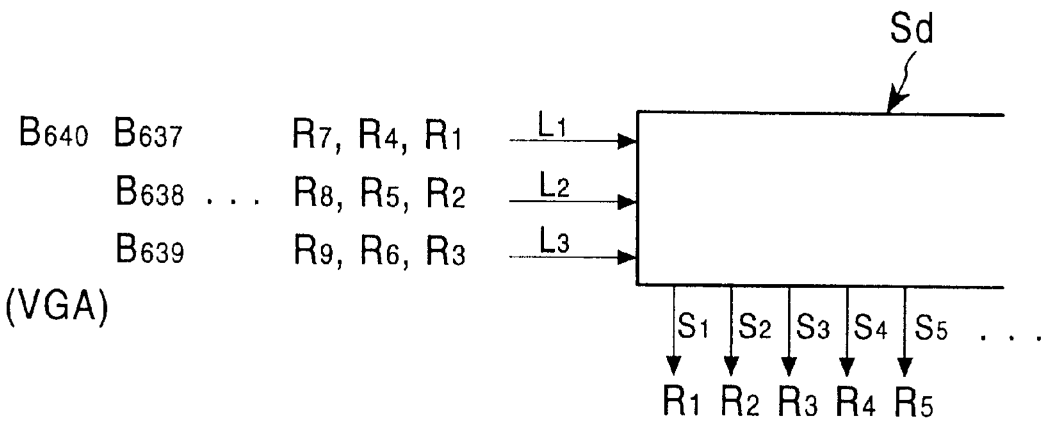
FIG. 5 is a view showing the relationship between the input signal to the source driver and the output data in driving the display device illustrated in FIG. 1.

That means, the data input format is employed so that, among three input lines to the source driver Sd as indicated in FIG. 5, the R,G and B signal data are inputted from the first input line $L_1$ in the order of R1, R4, R7, . . . , R634, R637, R640, G1, G4, G7, . . . , G634, G637, G640, B1, B4, B7, . . . , B634, B637, B640, the R,G and B signal data are inputted from the second input line $L_2$ in the order of R2, R5, R8, . . . , R632, R635, R638, G2, G5, G8, . . . , G632, G635, G638, B2, B5, B, . . . , B632, B635, B638, and the R,G and B signal data are inputted from the third input line $L_3$ in the order of R3, R6, R9, . . . , R633, R636, R639, G3, G6, G9, . . . , G633, G636, G639, B3, B6, B9, . . . , B633, B636, B639.

Figure 7:
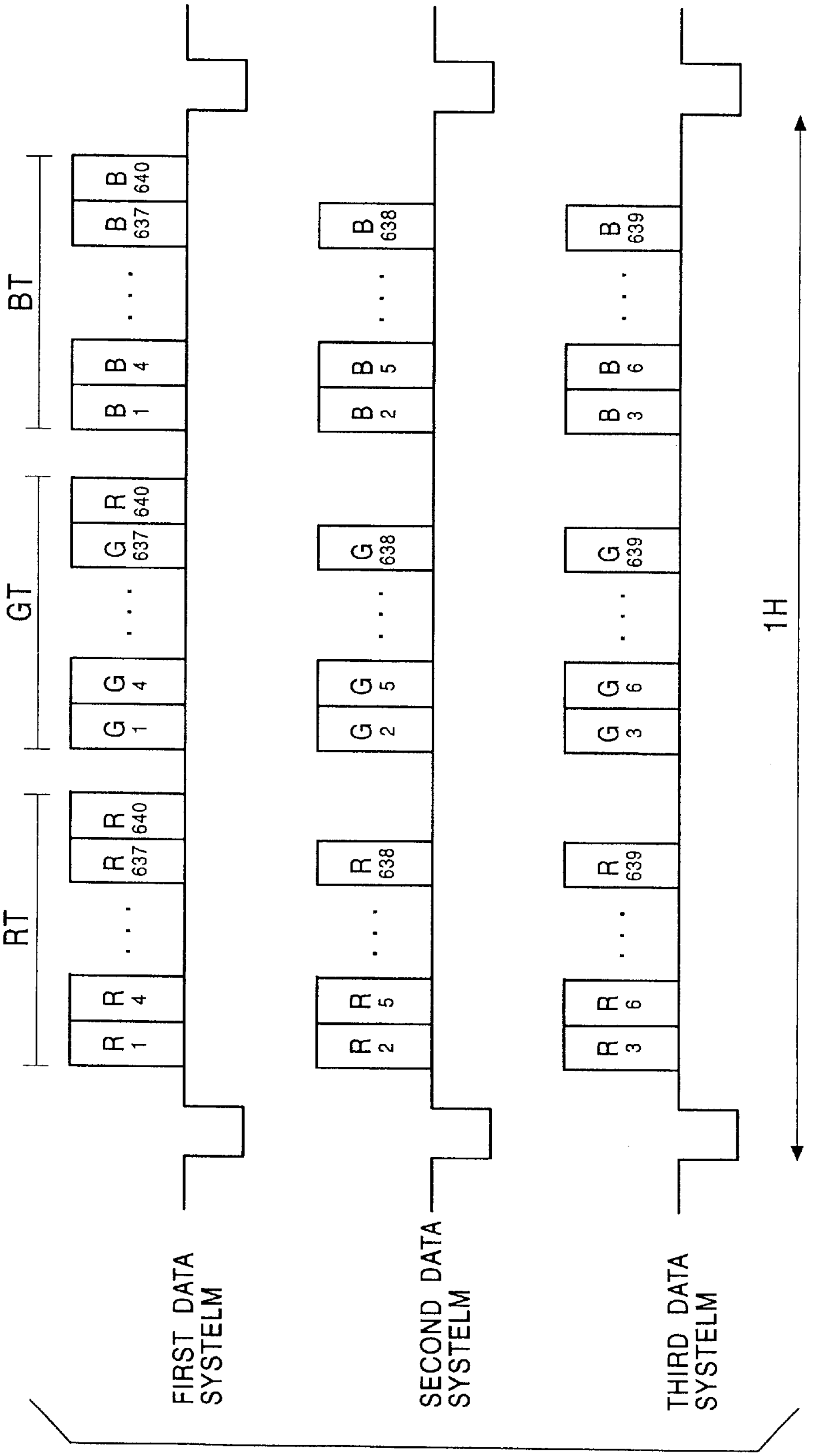
FIG. 7 is a view collectively showing the signals to be inputted in the source driver during one horizontal scanning time (1H) in driving the display device illustrated in FIG. 1.

The signals to be inputted from three input lines $L_1$, $L_2$ and $L_3$ are collectively and continuously described in one horizontal scanning time (1H) in FIG. 7.

Figure 4:
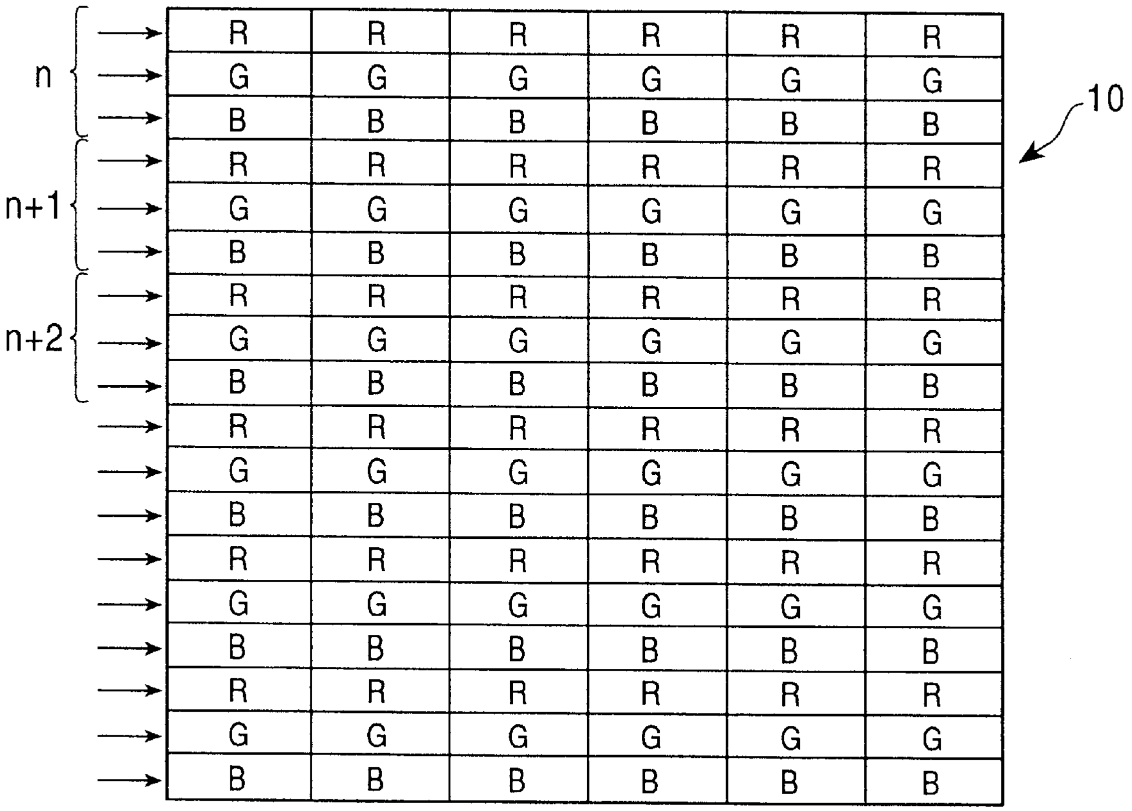
FIG. 4 is an explanatory view to describe the scanning order in scanning each pixel in the structure illustrated in FIG. 1.

Display can be made together with the signal input to the previous signal lines $S_1$, $S_2$, $S_3$, $S_4$, $S_5$, . . . , $S_n$ by repeating the scanning in the order of the R-line, G-line and B-line in the n-th scanning, the scanning in the order of R-line, G-line and B-line in the next (n+1)-th scanning, and the scanning in the order of R-line, G-line and B-line in the next (n+2)-th scanning as indicated in FIG. 4.

When the source driver Sd performs the serial-parallel conversion similar to that in the previous case by employing the above-mentioned data input format, the appropriate signal to meet the dot arrangement of the liquid crystal display device of the structure illustrated in FIGS. 1 and 2 such as R1, R2, R3, R4, R5 . . . to the signal lines $Sl_1$, $S_2$, $S_3$, $S_4$, $S_5$ . . . , can be inputted from the source driver Sd as indicated in FIG. 5.

Figure 8:
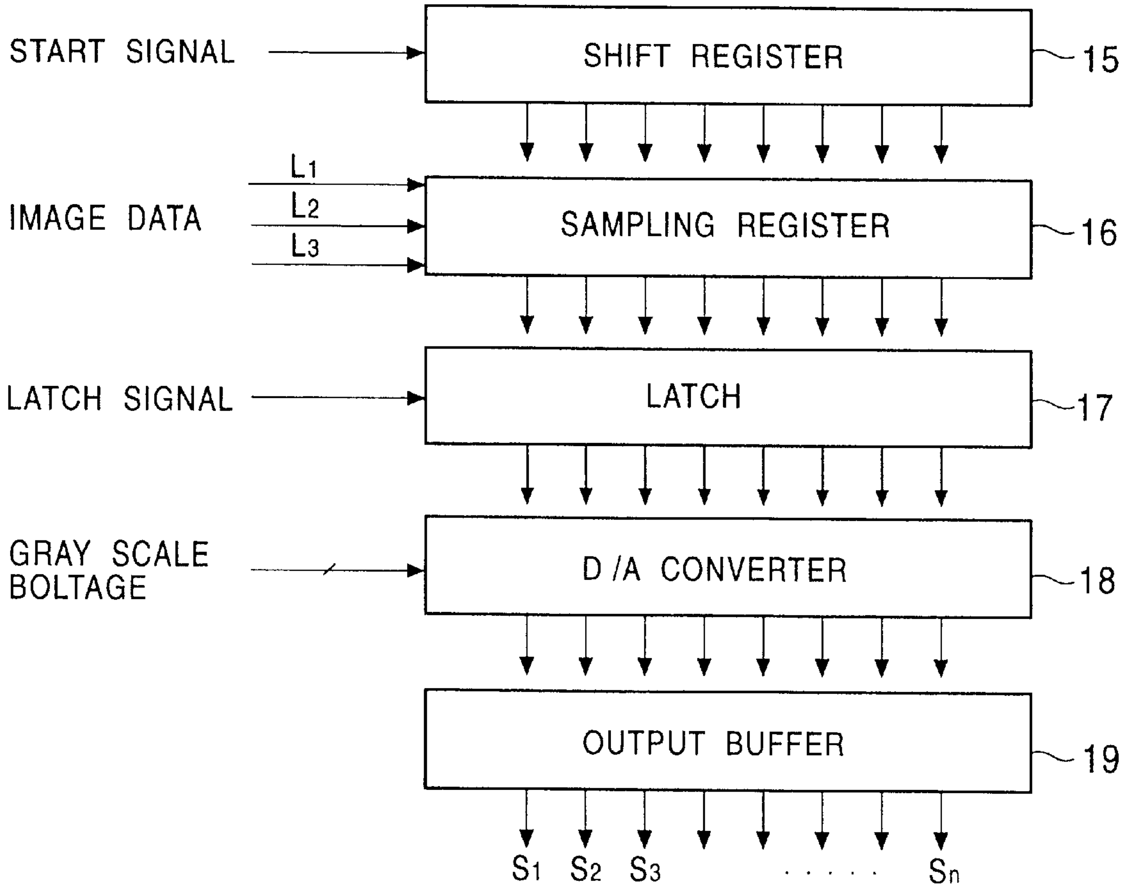
FIG. 8 is a view showing one example of an internal block structure of the source driver to be used in the display device illustrated in FIG. 1, and the flow of the signal.

One example of the internal block structure of the source driver Sd to be used in the present invention and the flow of the signal are indicated in FIG. 8.

The internal block structure of the source driver Sd to be used in this mode is constituted as illustrated in FIG. 8, and when the start signal to instruct the fetch of the data is inputted to a shift register 15, the image signal data are fetched from three input lines $L_1$, $L_2$ and $L_3$ to a sampling register 16. The latch signal to be inputted to a latch 17 is the signal to instruct the fetch to the latch 17 when all image signal data for one horizontal scanning line are received, and the image signal data inputted in the sampling register 16 are transmitted to the latch 17 all in one by the latch signal. The signal received by the latch 17 is transmitted to the signal lines $Sl_1$, $S_2$, $S_3$, $S_4$, $S_5$, . . . $S_n$ through a D/A converter 18 and an output buffer 19.

As mentioned above, a special data input format different from the conventional one is employed in the present invention, and a circuit to convert the data input format of the conventional standard described referring to FIG. 6 into the data input format described referring to FIG. 5 must be provided between the liquid crystal display device and an image signal generating device such as a personal computer to be connected to the liquid crystal display device.

Figure 9:
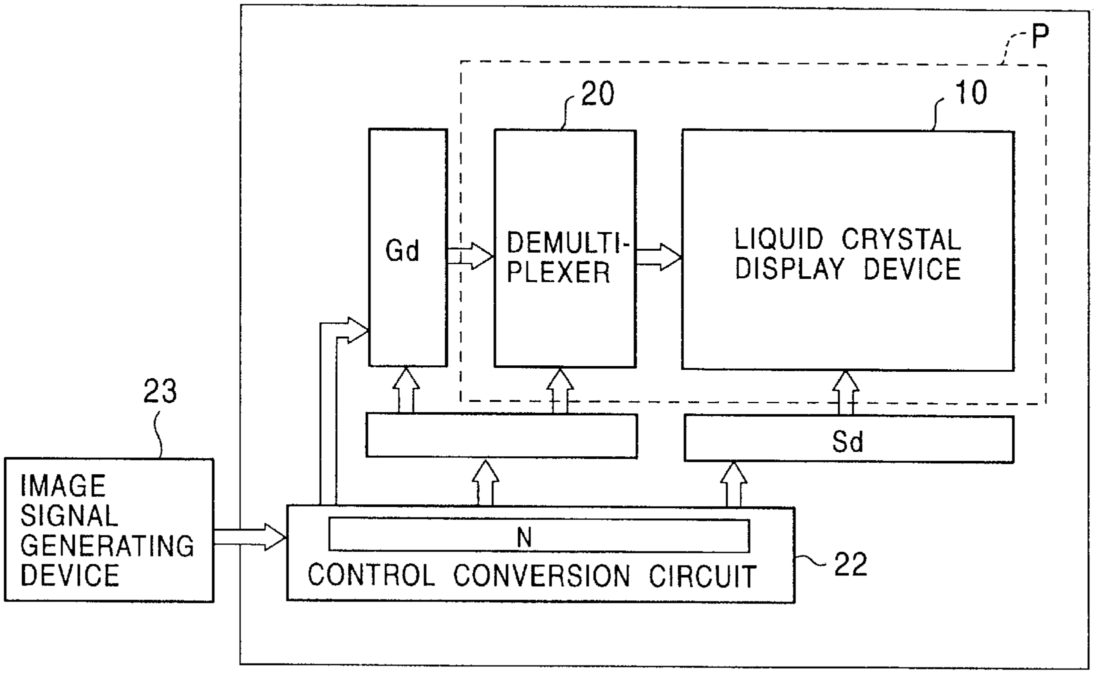

The structure of an example in which such a circuit is connected to the liquid crystal display device is illustrated in FIG. 9.

In the structure indicated in FIG. 9, the gate driver Gd is connected to the liquid crystal display device 10 through a demultiplexer 20, a control conversion circuit 22 is connected to a level shifter 21 connected to the demultiplexer 20 and the gate driver Gd, and the source driver Sd is also connected to the control conversion circuit 22. P denotes a panel on which the liquid crystal display device 10 and the demultiplexer 20 are mounted.

Because the above-mentioned special data input format different from the conventional one, a signal input means N to convert the conventional standard data input format referring to FIG. 6 into the data input format described referring to FIG. 5 must be provided between the liquid crystal display device and an image signal generating device 23 such as a personal computer to be connected to the liquid crystal display device 10, and in this example, such a signal input means N is built in the control conversion circuit 22. More specifically, the signal input means N may be a conversion circuit to change the order in reading the image signal from the graphic memory to store the image signal.

Even when the data signal input format to be inputted from the image signal generating device 23 to the control conversion circuit 22 is of the same system as the conventional one, the display device of the present invention can be driven without changing any items of the drive circuit system such as the image signal generating device 23, the demultiplexer 20, the gate driver Gd, the level shifter 21, and the source driver Sd through the conversion into the data input format described referring to FIG. 5 in the signal input circuit N of the control conversion circuit 22.

It is natural that the signal input means N to perform the data conversion need not be built in the control conversion circuit 22, and the signal input means may be provided on the side of the image signal generating device 23 such as the personal computer, or between the image signal generating device 23 and the control conversion circuit 22.

By employing the data input format illustrated in FIGS. 5 and 7, scanning can be performed at the speed three times higher than the conventional speed, and the input order of the data can be easily handled by changing the reading order of the graphic memory. In addition, as for the data input rate, the data for 800 picture elements (the effective data among them are 640) has been inputted in the display of the regular 640×480 VGA specification. Even in the data input format as illustrated in FIG. 7, the period of RT (R signal input period), GT (G signal input period), and BT (B signal input period), are 214 pixels respectively, totaling 642 pixels (214×3), and can be easily handled by reducing the conventional blanking period by two pixels, and no problems are presented even when the data input rate (the input speed) is completely same as the conventional value.

Figure 10:
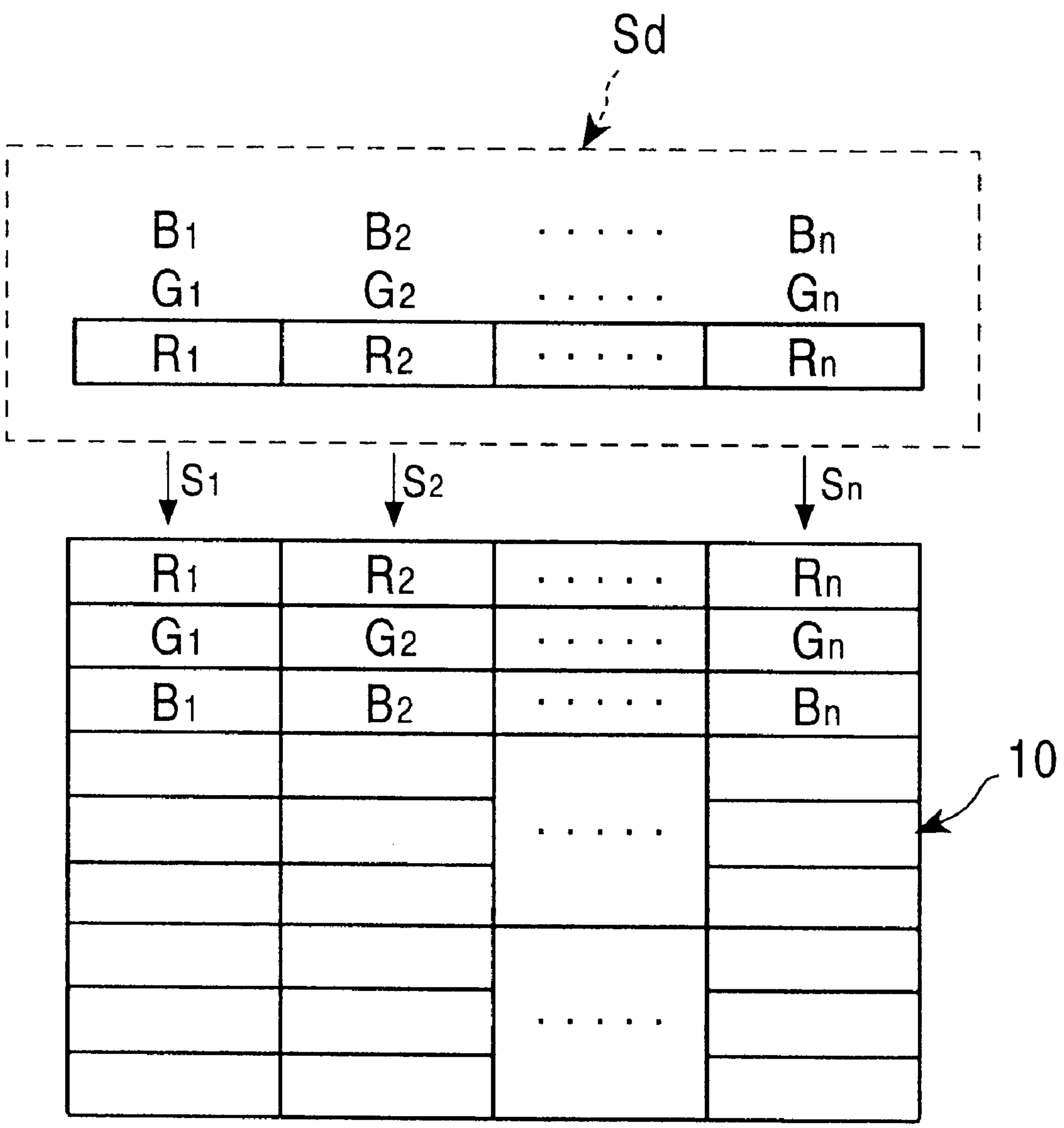
FIG. 10 is a view showing the relationship between the input signal to the source driver and the output data, and the array condition of the pixel of the liquid crystal display device in driving the display device illustrated in FIG. 1.

In addition, to easily understand the present invention, the input condition of the data input format to the source driver Sd in the liquid crystal display device 10 of the present invention and the output condition of the data output format from the source driver Sd to the liquid crystal display device are simply indicated in FIG. 10.

Figure 20:
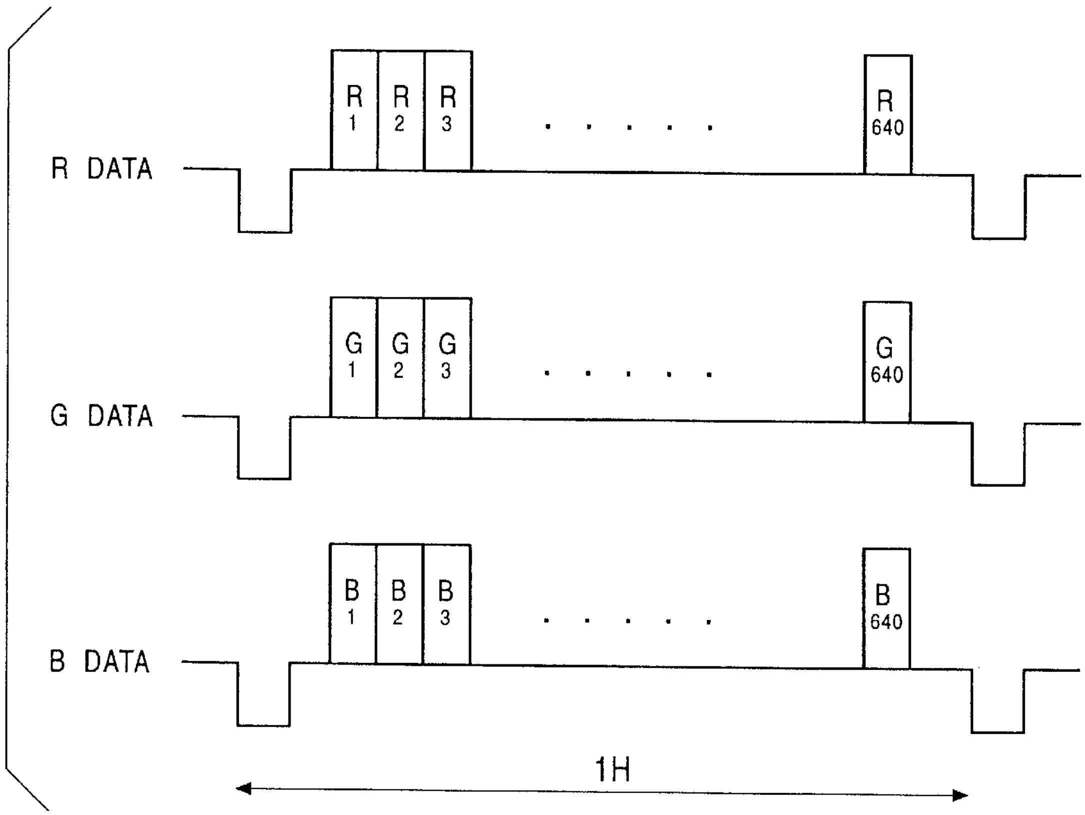
FIG. 20 PRIOR ART
FIG. 20 is a view collectively showing the signals to be inputted in the source driver during one horizontal scanning time (1H) in driving the conventional display device illustrated in FIG. 17.

By comparing the signal of the present invention indicated in FIG. 10 with the conventional structures indicated in FIGS. 11, 19 and 20 and its signal, the shape of the pixels constituting each picture element of the conventional liquid crystal display device 1 and the condition of the driving signal to each pixel are compared with the shape of the pixels constituting each picture element of the liquid crystal display device 10 of the present invention and the condition of the driving signal to each pixel to easily understand the difference.

In the case of the structures illustrated in FIGS. 1 and 2, the following effects are successful.

① In the structures illustrated in FIGS. 1 and 2, no degradation in image quality is generated, compared with the image quality of the liquid crystal display device of the conventional structure illustrated in FIGS. 17 and 18.

That means, when one screen is viewed in the three-dimension manner, the number of picture elements is 307200, which is same both in the structure illustrated in FIG. 1 and the structure illustrated in FIG. 17, and no resolution is changed. When one screen is viewed in the time base, the frame frequency is 60 Hz, which is same both in the structure illustrated in FIG. 1 and in the structure illustrated in FIG. 17, and no problems are presented in the aspect of the animation processing.

② In the structure illustrated in FIGS. 1 and 2, the same gate driver and source driver as those in the liquid crystal display device of the conventional structure illustrated in FIGS. 17 and 18, and the number of the source drivers which are about two times as expensive as the gate drivers can be reduced from eight to three though the number of inexpensive gate drivers must be increased from two to six, and the cost can be reduced as a whole.

③ The power consumption can be reduced.

As for the power consumption of the driver, six gate drivers of about 20 mW in unit power consumption are required, and the required power consumption is 120 mW, but the frequency when the scanning lines are scanned is increased three times, the power consumption for one gate driver becomes three times, totaling 360 mW. Three source drivers of about 100 mW in unit power consumption are required, totaling 300 mW, and the grand total power consumption is 660 mW while about 840 mW has been required for the conventional structure, and the power consumption of the present invention can be reduced to about 4/5.

Other mode of the driving method when the structure illustrated in FIGS. 1 and 2 is employed is described below referring to FIG. 12.

The embodiment of the previous driving method is a method in which every pixel is driven in one field, but in the present invention, the interlaced scanning can be performed.

Figure 12:
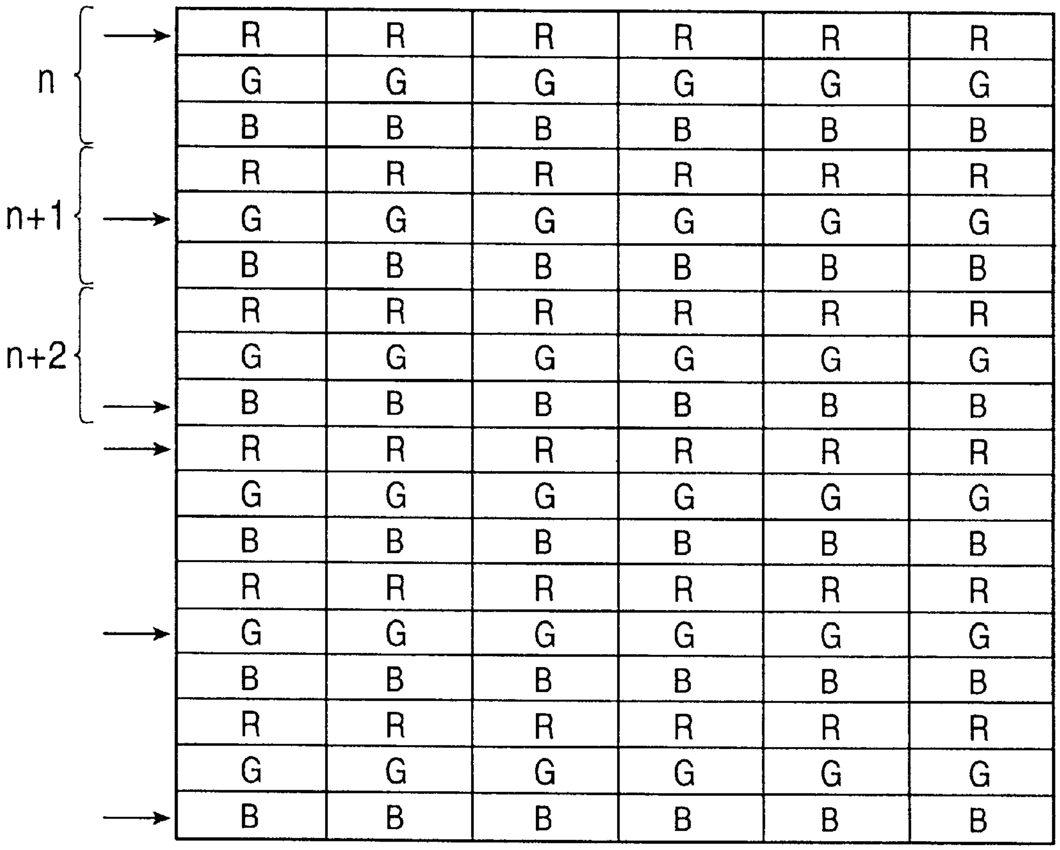
FIG. 12 is a view showing a second example of a method to drive the structure of the first embodiment of the liquid crystal display device of the present invention.

That means, the period to input the data in the source driver Sd can be reduced to 1/3 by scanning only one color among the n-th scanning line corresponding to one scanning line as illustrated in FIG. 12. Though every pixel is not refreshed in one field, the power consumption can be further reduced than the previous mode without degradation of the display quality in the case of the display mode free from movement such as the still picture.

More specifically, the frequency at which the gate driver scans the scanning lines is about 30 kHz, which is same as that in the conventional structure illustrated in FIGS. 17 and 18, and can be 1/3 of the driving method in the first embodiment of the present invention. Accordingly, the dot clock is 30 kHz×640 in the display of VGA specification, and is about 30 kHz which is same as the drive by the conventional structure illustrated in FIGS. 17 and 18, and reduced to 1/3 of the value in the previous mode of the present invention.

When the driving method of the above-mentioned interlaced scanning is employed, the following effects can be obtained.

① The gate drivers and source drivers equivalent to those used in the conventional structure illustrated in FIGS. 17 and 18 can be used, and the number of expensive source drivers can be reduced from eight to three though the number of inexpensive gate drivers must be increased from two to six, and the cost can be reduced.

② As for the power consumption, the power consumption for six gate drivers of about 20 mW in unit power consumption is 120 mW, and the power consumption for three source drivers of about 100 mW in unit power consumption is 300 mW, totaling about 420 mW, and the total power consumption can be reduced to about at half of about 840 mW for the conventional structure.

③ The number of design-changed parts of the circuit can be reduced. (The conventional structure can be appropriated more compared with the first mode.) In particular, one frame is classified by the field of the number of basic colors (three fields of R, G and B in this mode), the field frequency is 60 Hz, and scanning is performed skipping two scanning lines, and the frequency to scan the scanning lines of the gate driver can be about 30 kHz with 640×480 which is completely same as that in the conventional structure, and the peripheral circuit of the gate driver can be same as that in the conventional structure.

If R is selected among the n-th scanning line so as not to generate the eccentricity in color in the case of the interlaced scanning, G is preferably selected among the next (n+1)-th scanning line, and further, B is preferably selected among the next (n+2)-th scanning line. The selection order of the scanning line is not limited to the order of R, G and B as in this mode, but any other order of R, G, B or G, R, B may b e acceptable.

Figure 13:
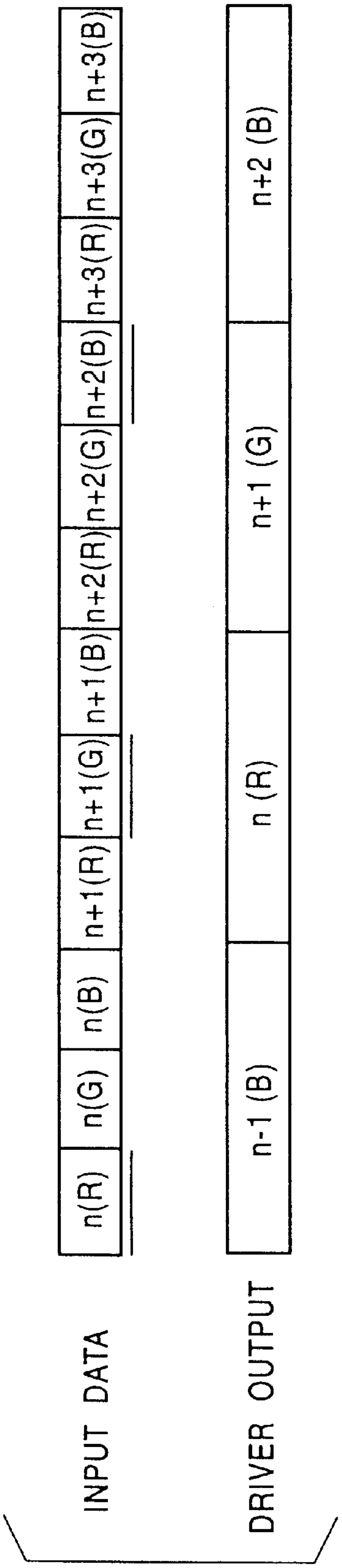
FIG. 13 is a view showing the relationship between the input signal to the source driver in the structure illustrated in FIG. 12 and the output data.

FIG. 13 shows comparison of the input data and the output data for the source driver in the case of the interlaced scanning.

In the input data, all data are transmitted in the order of n-th, (n+1)-th, (n+2)-th, (n+3)-th, . . . similar to those in the previous mode, but as for the output of the driver to the source driver Sd, B which is inputted in the (n-1)-th order is outputted for the period corresponding to the input data of R, G and B in the n-th order, R which is inputted in the n-th order is outputted for the period corresponding to the input data of R, G and B in the (n+1)-th order, G which is inputted in the (n+1)th order is outputted for the period corresponding to the input data of R, G and B in the (n+2)-th order, B which is inputted in the (n+2)-th order is outputted for the period corresponding to the input data of R, G and B in the (n+3)-th order, and these inputs are successively repeated.

Figure 14A:
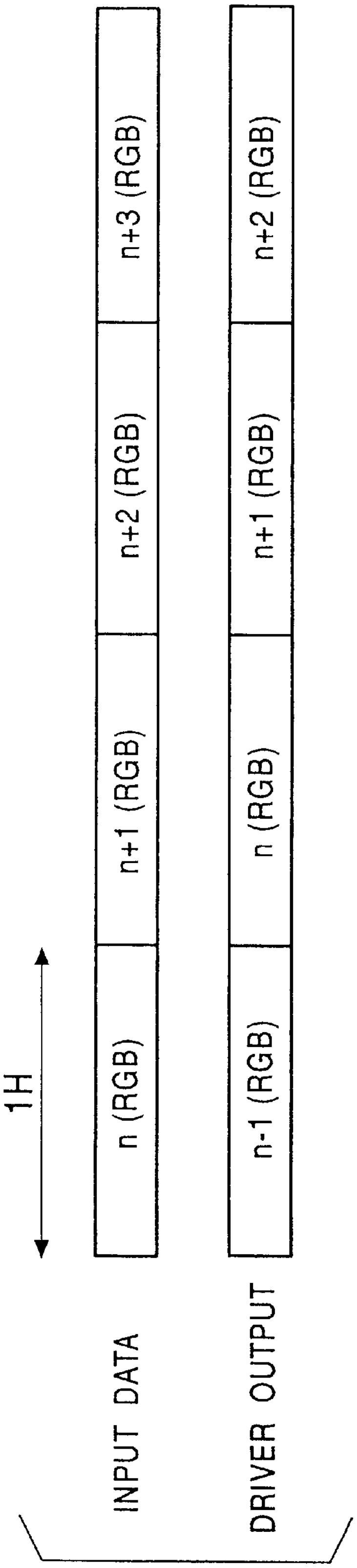
FIG. 14A is a view to show the input signal and the output data of the conventional device illustrated in FIG. 17.
Figure 14B:
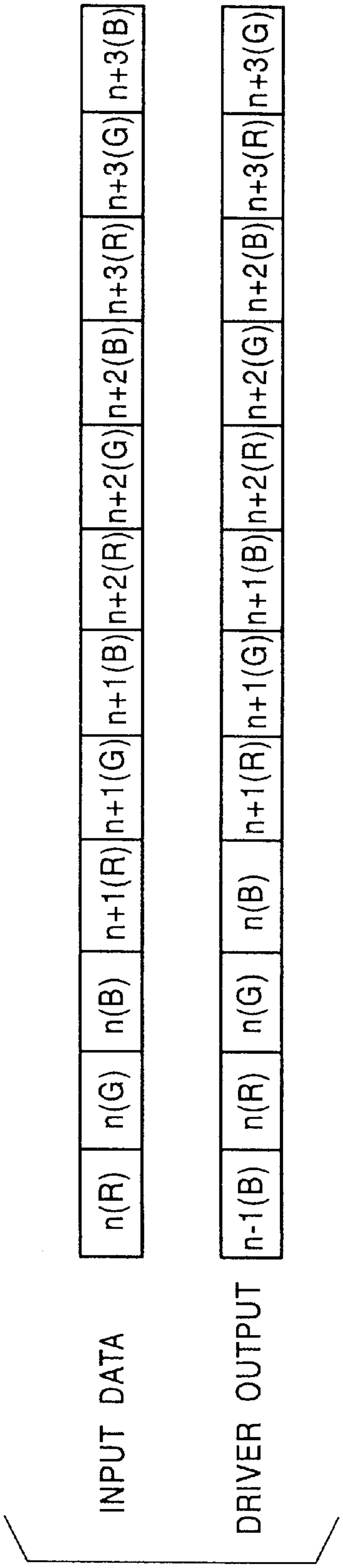
FIG. 14B is a view showing the relationship between the input signal and the output data of the first embodiment illustrated in FIG. 1.

The data timing relationship is indicated in FIG. 14A when the timing relationship similar to that between the input data indicated in FIG. 13 and the output data of source driver is performed to the conventional device (when the conventional drive is performed using the liquid crystal display device illustrated in FIGS. 17–19), and the data timing relationship is indicated in FIG. 14B when the timing relationship similar to the timing relationship between the input data indicated in FIG. 13 and the output data of the source driver is performed to the device of the previous embodiment (when the drive of the present invention is performed using the liquid crystal display device of the present invention indicated in FIGS. 1–3).

If the drive is based on the output data indicated in FIG. 13, it can be outputted at the driver output timing similar to that of the conventional drive indicated in FIG. 14A, and it is clear that the conventional drive circuit can be used.

In each above-mentioned mode, explanation is made based on the case of the liquid crystal display device (TFT-LCD) using the thin film transistor, and similar effect can be expected in the matrix-addressed display device in which picture elements to display one color by combining a plurality of basic colors (e.g., R, G and B) are arranged, and it is natural that the present invention can be extensively applied to, passive matrix-addressed liquid crystal display device, FED (Field Emission Display), ferroelectric liquid crystal display device, plasma display, EL display, etc. When one picture element is divided into basic colors, two-color division or four-color division is possible, and in such a case, the number of scanning lines is increased by two times or four times, and as for the arrangement of the color filter, two colors or four colors are arranged in the transverse stripe manner as mentioned above.

Figure 15:
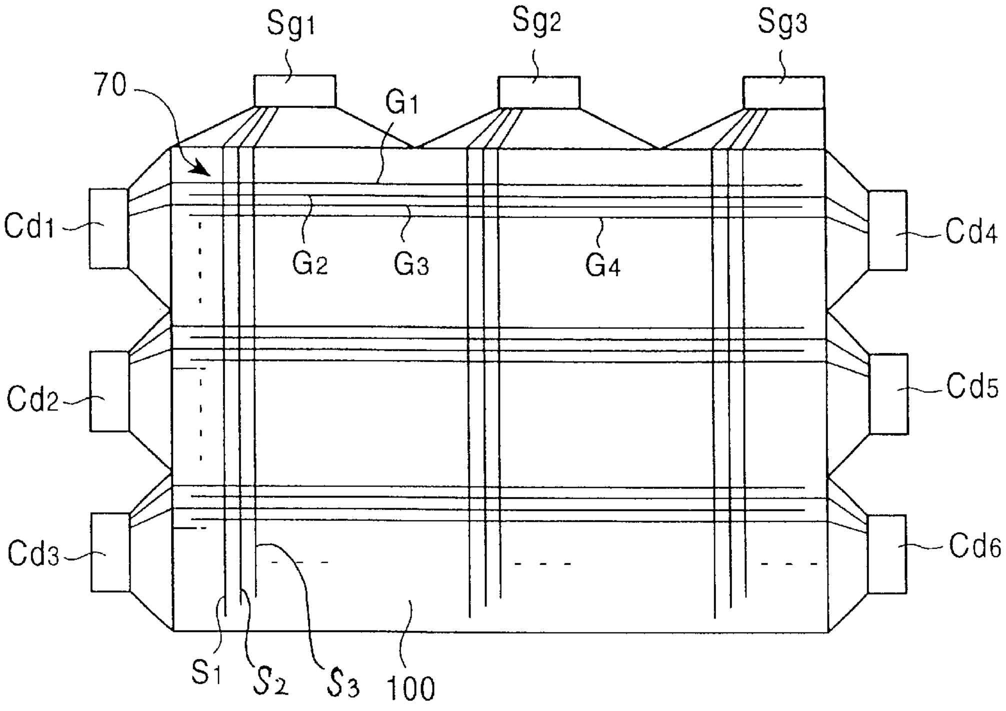
FIG. 15 is a view illustrating one embodiment in which the present invention is applied to the passive matrix-addressed liquid crystal display device.
Figure 16:
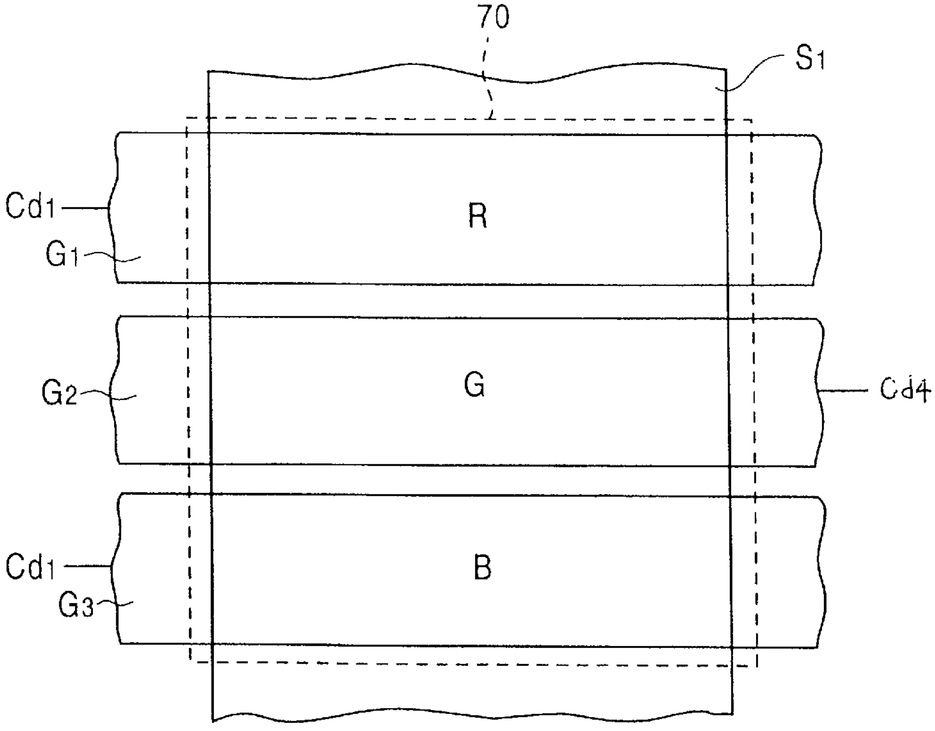
FIG. 16 is an enlarged view of one pixel of the liquid crystal display device illustrated in FIG. 15.

FIGS. 15 and 16 show the example in which the present invention is applied to the passive matrix-addressed liquid crystal display device, the liquid crystal is filled between two transparent substrates, the color filter is provided on the liquid crystal side of one transparent substrate, and the scanning lines $G_1$, $G_2$, . . . consisting of a transparent conductive layer are arranged on one transparent substrate, and the signal lines $S_1$,$S_2$ . . . consisting of a transparent conductive layer are arranged on the liquid crystal side of the other substrate in a crossing and opposite manner to each other to constitute a liquid crystal display device 100. FIG. 16 indicates only one picture element 70 of the liquid crystal display device 100 indicated in FIG. 15 in an enlarged manner, and the color filter in this mode is divided into three parts of R, G and B, and the scanning line G is provided in each region divided into three of R, G and B.

Segment drivers $Sg_1$, $Sg_2$, $Sg_3$ are provided on an upper edge part of the transparent substrate, the terminal of each driver is connected to the respective signal line S, three common drivers, totaling six common drivers ($Cd_1$–$Cd_6$) are provided on right and left edge parts of the transparent substrate respectively, and the terminal of each driver is connected to the respective scanning lines G.

Even in this example, similar to the previous example, the gate lines G . . . are alternately connected to the common drivers Cd on the left side, and the rest of the gate lines G . . . are alternately connected to the common drivers on the right side.

In this example, the picture element is constituted in the region to be demarcated by the signal line S and three scanning lines G, and the purpose is fulfilled by constituting the picture element by three pixels in a divided manner.

In the passive matrix-addressed liquid crystal display device, the electric field is applied to the liquid crystal present between the crossed parts of the signal lines S and the scanning lines G which are opposite to and across each other, and the liquid crystal is driven, and the part at which the signal line S is across the scanning line G forms one pixel.

In the explanation of each mode, the display device of VGA specification of 640×480 picture elements is described, and there are various kinds of display modes of the screen, and it is natural that the structure of the present invention can be applied to various standards including the NTSC type TV screen of 480 scanning lines, the PAL type TV screen of 570 scanning lines, HDTV type of 1125 scanning lines, SVGA specification of 600 scanning lines, XGA specification of 768 scanning lines, and EWS specification of 1024 scanning lines.

Further, the driving method in the first embodiment described referring to FIGS. 3 through 5 can be switched to the driving method of the interlaced scanning described referring to FIGS. 12 and 13. For example, when the liquid crystal display device is used for a notebook PC, a change-over switch is provided around the display device of the notebook PC, and the drive circuit to perform the driving method described referring to FIGS. 3 through 5 is switched to the drive circuit to perform the driving method described referring to FIGS. 12 and 13 so as to change the display condition of the display device according to the application.

Provision of the signal input means N of the present invention is not limited to the liquid crystal display device of three-time scanning line type whose basic constitution is indicated in FIGS. 1 through 3, but the number of the scanning lines and signal lines may be general. In such a case, the signal to be transmitted to each signal line per each scanning line by the signal input means can be successively transmitted to the source driver.

As described above, in the present invention, the signal to be transmitted to each signal line per each scanning line can be successively transmitted to the source driver by the signal input means, and the data input of the drive signal can be performed in the order of the data of the color to be driven during one horizontal scanning period, and the preferable signal input mode can be taken to each matrix addressed pixel. The signal can be inputted only by changing a part of the data input format of the drive signal to be used in the conventional device, and replacing a part of the drive signal, and the circuit can be easily changed to a minimum.

Further in the above-mentioned structure, if the structure in which the number of the scanning lines is the number of the total pixels arranged along the signal line, and the order of the basic colors arranged along the signal line is the same order to be repeated along the signal line, is employed, no degradation in image quality is generated compared with the display device of the conventional structure, the display can be performed using the same gate drivers and source drivers as those of the liquid crystal display device of the conventional structure, and the source drivers with larger power consumption can be greatly reduced in number. In addition, reduction in the power consumption attributable to reduction of source drivers in number can be larger than the increase in the power consumption attributable to the increase of the gate drivers in number though the required number of gate drivers smaller in the power consumption than source drivers is increased, and the power consumption can be reduced than that of the conventional structure as a whole.

For example, when one picture element is constituted by three basic colors, the number of the scanning lines must be increased by three times that of the conventional structure, and the number of the gate drivers must be three times that of the conventional structure, but the number of the signal lines can be reduce to ⅓ that of the conventional structure, and the number of the source drivers can be reduced to ⅓ that of the conventional structure.

Then, as for the power consumption of the drivers, the number of the source drivers whose power consumption is large can be greatly reduced, and as a whole, the power consumption can be suppressed even when the increase in the power consumption of the gate drivers is subtracted.

In the above-mentioned constitution, the display device can be driven in a similar manner to that of the conventional structure by dividing one frame into a plurality of fields, and performing the scanning for each field.

In the above-mentioned constitution, the scanning frequency can be same as that in the drive of the conventional structure irrespective of the increase of the number of the scanning lines by dividing one frame into a plurality of fields, and performing the interlaced scanning for the prescribed fields, and the power consumption for each source driver can be further reduced, and the power can be saved.

Then, the display device capable of selecting the driving system to meet various kinds of display modes can be provided by the structure capable of switching the drive circuit to form the driving method in the display device.

What is claimed is:

1. A display device comprising:

a plurality of pixels arranged in a matrix, each pixel containing a set of three dots, each of said three dots having one of three fundamental colors consisting of red, green and blue, each of the plurality of pixels operative to display one color by a number of combinations of the three fundamental colors;

a plurality of scanning lines, each of the scanning lines defining a row of the matrix;

a plurality of signal lines, each of the signal lines defining a column of the matrix, each of the pixels being driven by one of the signal lines and three of the scanning lines and each dot being driven by one of the scanning lines and one of the signal lines; and a signal input converter to convert a conventional standard data input format sent from a video signal generator into a specific data format, the specific data format input into a plurality of source drivers to send a driving signal to the plurality of signal lines;

wherein the pixels are arranged along the signal lines such that the set of three dots contain in the pixels disposed along each of the signal lines are repeated in each pixel in a set order and the dots disposed along each of the scanning lines are repeated in a predetermined order, and the number of the scanning lines is set to the number of pixels along the signal lines multiplied by the number of fundamental colors, the number of dots arranged along each of the signal lines is set to the multiplied number, and the number of dots arranged along each scanning line is set to be equal to the number of pixels arranged along each scanning line.

2. A display device according to claim 1, wherein:

the conventional standard data input is a first three series of a particular fundamental color, each of the first three series of the particular fundamental color of consecutive data for a first pixel having the particular fundamental color to a last pixel having the particular fundamental color, and the specific data format is a second three series, each series of the second three series having three consecutive internal series, each of the three consecutive internal series of data for pixels of a unique one of the fundamental colors, each of the three consecutive internal series of data having consecutive data for non-consecutive pixels, the consecutive data for non-consecutive pixels being ordered such that the data is for pixels n, n+3, . . . n+3m, each series of the second three series having a unique n selected from 1, 2 and 3.

3. A display device according to claim 2, wherein the three fundamental colors consisting of red, green and blue, arranged along each of the signal lines, are alternately repeatedly such that the same fundamental color is arranged along each of the scanning lines.

4. A display device according to claim 2, wherein the three fundamental colors consisting of red, green and blue, arranged along each of the signal lines, are alternately repeatedly such that the same fundamental color is arranged obliquely with respect to each of the signal lines, and the different fundamental colors are arranged adjacent to each other along each of the scanning lines.

5. A display device according to claim 2, wherein the signal input converter is integrated into a control conversion circuit in a driving circuit to drive the display device.

* * * * *

UNITED STATES PATENT AND TRADEMARK OFFICE
CERTIFICATE OF CORRECTION

PATENT NO. : 6,323,871 B1
DATED : November 27, 2001
INVENTOR(S) : Tatsumi Fujiyoshi et al.

It is certified that error appears in the above-identified patent and that said Letters Patent is hereby corrected as shown below:

Column 14,
Line 31, delete “contain” and substitute -- contained -- in its place.
Line 33, delete “a set order” and substitute -- a first order -- in its place.
Line 34, delete “in a predetermined order, and” and substitute -- in a second order, each scanning line is disposed between adjacent dots, and -- in its place.

Signed and Sealed this

Thirtieth Day of December, 2003

JAMES E. ROGAN
*Director of the United States Patent and Trademark Office*